United States Patent
Zhao et al.

(10) Patent No.: US 10,013,488 B1
(45) Date of Patent: Jul. 3, 2018

(54) DOCUMENT ANALYSIS FOR REGION CLASSIFICATION

(71) Applicant: Amazon Technologies, Inc., Reno, NV (US)

(72) Inventors: Ming Zhao, Bellevue, WA (US); Hanning Zhou, Seattle, WA (US); Xi Long, Bellevue, WA (US); Xuping Zhang, Seattle, WA (US); Jian Lin, Lynnwood, WA (US); Sherif M. Yacoub, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 752 days.

(21) Appl. No.: 13/627,621

(22) Filed: Sep. 26, 2012

(51) Int. Cl.
*G06F 17/30* (2006.01)

(52) U.S. Cl.
CPC .............................. *G06F 17/30831* (2013.01)

(58) Field of Classification Search
CPC ... G06F 17/30831; G06F 17/211; G06F 17/24
See application file for complete search history.

(56) References Cited

U.S. PATENT DOCUMENTS

| | | | |
|---|---|---|---|
| 7,715,635 B1* | 5/2010 | Shagam et al. | 382/225 |
| 2004/0006742 A1* | 1/2004 | Slocombe | 715/513 |
| 2008/0215314 A1* | 9/2008 | Spangler | G06K 9/6223 704/10 |
| 2009/0327285 A1* | 12/2009 | Mansfield et al. | 707/5 |
| 2010/0174985 A1* | 7/2010 | Levy et al. | 715/244 |

* cited by examiner

*Primary Examiner* — Scott Baderman
*Assistant Examiner* — Seung Jung
(74) *Attorney, Agent, or Firm* — Lowenstein Sandler LLP

(57) ABSTRACT

A document analysis module analyzes electronic media items and identifies regions and region types for the electronic media items. The document analysis module may use rules, typographical feature sets, and cluster analysis to identify regions and region types. The document analysis module may also receive user input and may use the user input to identify regions and region types. The document analysis module may further use template pages to identify regions and region types.

27 Claims, 9 Drawing Sheets

DOCUMENT ANALYSIS FOR REGION CLASSIFICATION

BACKGROUND

A large and growing population of users enjoys entertainment through the consumption of media items, including electronic media, such as electronic books (also referred to herein as ebooks), electronic newspapers, electronic magazines, and other electronic reading material. Users employ various electronic devices to consume such publications. Among these electronic devices are electronic book readers, cellular telephones, personal digital assistants (PDAs), smart phones, portable media players, tablet computers, electronic pads, netbooks, desktop computers, notebook computers, and the like.

Books (e.g., hard copy books or electronic books which do not contain formatting or region type information, such as portable document format (PDF) books) are often converted into other electronic media item formats (e.g., a Mobipocket (MOBI) format) in order to provide the book as an electronic media item to electronic devices (e.g., user devices). When the books are converted to different electronic media item formats, the converted books are often just scanned images of the pages of the book. In some instances, the optical character recognition may be performed on the images of the pages of the book to extract the text of the pages.

BRIEF DESCRIPTION OF THE DRAWINGS

Embodiments of the present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
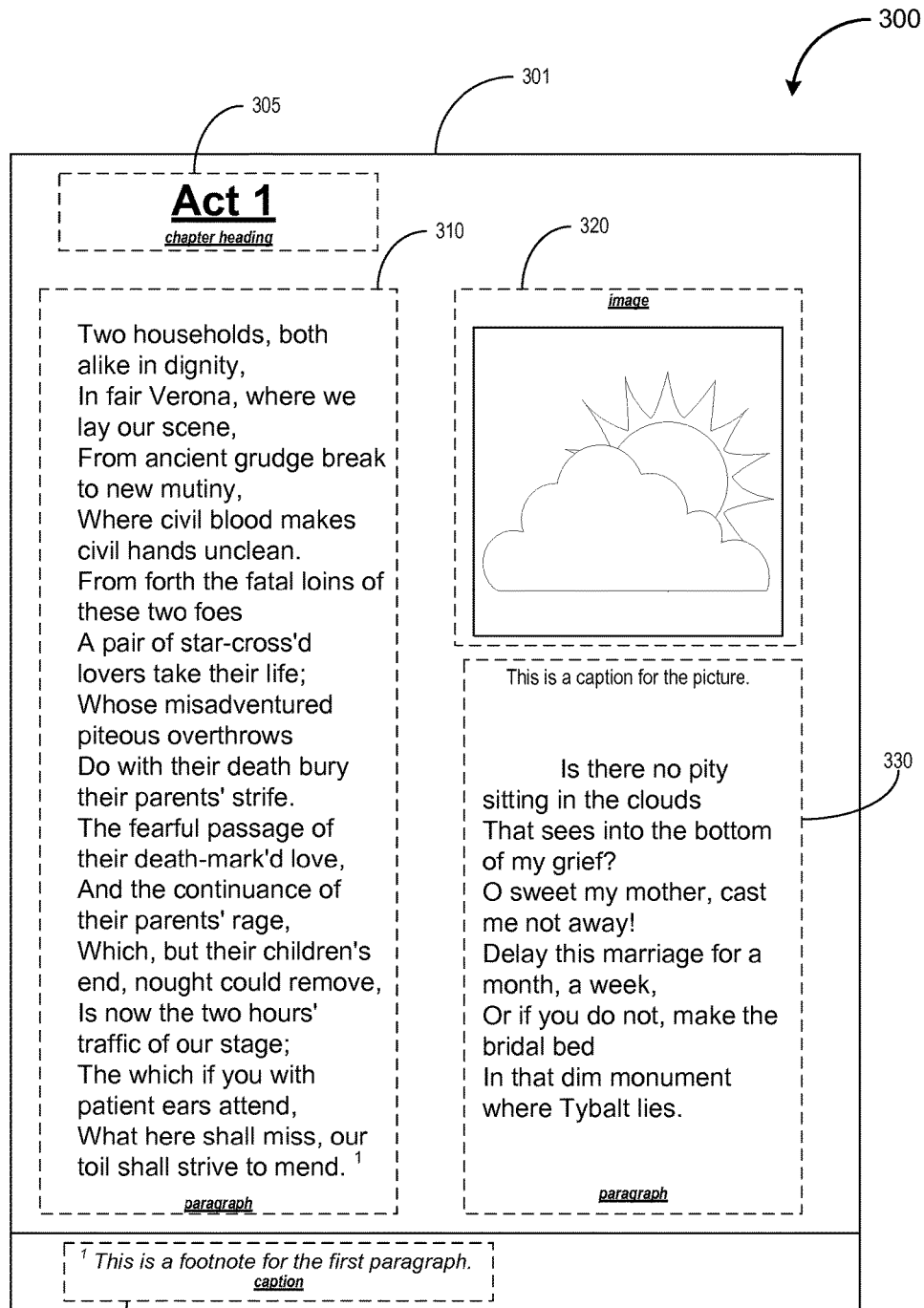
FIG. 1 is a diagram illustrating a graphical user interface (GUI) including a page from an electronic media item, according to one embodiment.

As electronic devices and user devices become more and more prevalent, more and more books (e.g., hard copy books, books in portable document format (PDF)) may be converted into different electronic media formats (e.g., MOBI format) so that the books may be viewed on the user devices. Users may want the ability to identify regions of book and the types for the regions of the book. For example, a simple image of a page of a book may include different region types in the page (e.g., paragraphs, footnotes, chapter headings, tables, etc.), and the user may want to be able to identify these region types to be able to better navigate through the book. However, identifying regions in a book and classifying the types of regions (e.g., performing document analysis on the book) may be a costly and/or time consuming process. Often, the document analysis is performed manually by a user (e.g., a user may have to go through the scanned pages of the book and identify regions and region types).

Some embodiments of the present invention may allow books which are converted into an electronic format (e.g., hard copy books or electronic books which did not previously identify regions or region types), to be analyzed automatically to identify regions and/or region types. Identifying the regions and/or region types in the electronic book may improve a user's reading experience by allowing a user to navigate more easily through the electronic book (navigate by chapters or by sections of the book), access content faster (e.g., select an entry in a table of contents to read a particular section of the book), browse the book by region types (e.g., go from footnote to footnote, or image caption to image caption), display only selected region types (e.g., a user may choose not to display any footnote regions and image regions), etc. Other embodiments of the invention may allow a user to provide corrections for a portion of the electronic book. The corrections provided by the user may be used to re-classify or re-identify regions and/or region types to increase the accuracy when identifying regions and/or region types.

Embodiments of a method and apparatus are described for a document analysis module which may analyze an electronic media item (e.g., an electronic book) and identify regions and/or region types in the electronic media item. The document analysis module may use multiple sets of rules to identify regions and/or region types in the electronic media item. Each set of rules may be used to identify a region type (e.g., one set of rules is used to identify footnote regions, another set of rules is used to identify chapter heading regions, etc.). The document analysis module may obtain typographical feature sets (e.g., data such as line spacing, font size, character spacing, indentation, etc.) for each of the regions. The document analysis module may also perform cluster analysis for all regions of the same region type (e.g., for all footnote regions) to obtain one or more clusters for the regions of the same region type. The document analysis module may update the rules for the region type based on the one or more clusters and may reapply the rules to identify new regions. The document analysis module may iteratively identify new regions using updated rule sets, obtain typographical feature sets, perform cluster analysis, and update rule sets, for a region type (e.g., for all regions which have the same region type) until the clusters converge (e.g., until the clusters stop changing, until the size of the cluster is within a threshold, etc.).

In one embodiment, the document analysis module may receive user input correcting and/or updating regions and/or region types which were identified or classified by the document analysis module. The document analysis module may use the user input to obtain updated typographical feature sets of the corrected regions and/or region types. The document analysis module may update the rule sets based on the updated typographical feature sets and may apply the updated rule sets to the pages of the electronic media item to identify regions and/or region types.

In another embodiment, the document analysis module may identify visual texture features in a page of an electronic media item (e.g., may perform morphological operations on the page). The document analysis module may determine the size, shapes, and/or locations of the regions (e.g., the size, shape and/or location of a bounding box around the region). The document analysis module may match a layout of the regions in the analyzed page (e.g., the sizes, shapes and/or locations of all the regions in a page) to a layout of a template page. The document analysis module may identify regions and/or region types on the page based on the region and/or region types of the template page.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

FIG. 1 is a diagram illustrating a graphical user interface (GUI) 300 including an exemplary page from an electronic media item, according to one embodiment. The GUI 300 may be provided and/or displayed by a document analysis module (e.g., document analysis module 127 shown in FIG. 2). The GUI 300 displays a page 301 of an electronic media item. The page of the electronic media item may have been processed or analyzed by the document analysis module (e.g., document analysis module may have identified sets of regions with the same region type, performed cluster analysis on all regions having the same region type, updated the rules for a region type, and iterated until the clusters converge).

In one embodiment, the document analysis module may use multiple sets of rules to identify regions and/or region types in the electronic media item. The document analysis module may also obtain typographical feature sets (e.g., data such as line spacing, font size, character spacing, indentation, other formatting information, etc.) for each of the regions. The document analysis module may also perform cluster analysis for all regions of the same region type (e.g., for all footnote regions) to obtain one or more clusters for the regions of the same region type. The document analysis module may update the set of rules for the region type based on the one or more clusters and may reapply the rules to identify new regions. The document analysis module may iteratively identify new regions using updated rule sets, obtain typographical feature sets, perform cluster analysis, and update rule sets, for a region type until the clusters converge.

As shown in FIG. 1, the document analysis module may have identified regions 305, 310, 315, 320, and 330 in the page 301 and the region types for each of the regions 305, 310, 315, 320, and 330. Region 305 is identified as a chapter heading region. Region 310 is identified as a paragraph region. Region 315 is identified as a caption region. Region 320 is identified as a graphic or image region. Region 330 is identified as a paragraph region. Also as shown in FIG. 1, region 315 is actually a footnote for the page 301. However, the document analysis module has incorrectly identified region 315 as a caption region. Similarly, region 330 is also incorrectly identified. Region 330 includes a caption region (e.g., the text "This is a caption for the picture."). However, the document analysis module has incorrectly identified the caption region as part of the paragraph region 330.

In one embodiment, the document analysis module may also receive user input correcting and/or updating regions and/or region types which were identified or classified by the document analysis module. The document analysis module may obtain updated typographical feature sets of the corrected regions and/or region types, based on the user input. The document analysis module may update the rule sets based on the updated typographical feature sets and may apply the updated rule sets to the pages of the electronic media item to identify regions and/or region types.

In another embodiment, the document analysis module may identify visual texture features in a page of an electronic media item by performing morphological operations on the page. The document analysis module may determine the size, shapes, and/or locations of the regions. The document analysis module may match a layout of the regions in the analyzed page to a layout of a template page and may identify regions and/or region types on the page based on the region and/or region types of the template page.

Figure 2:
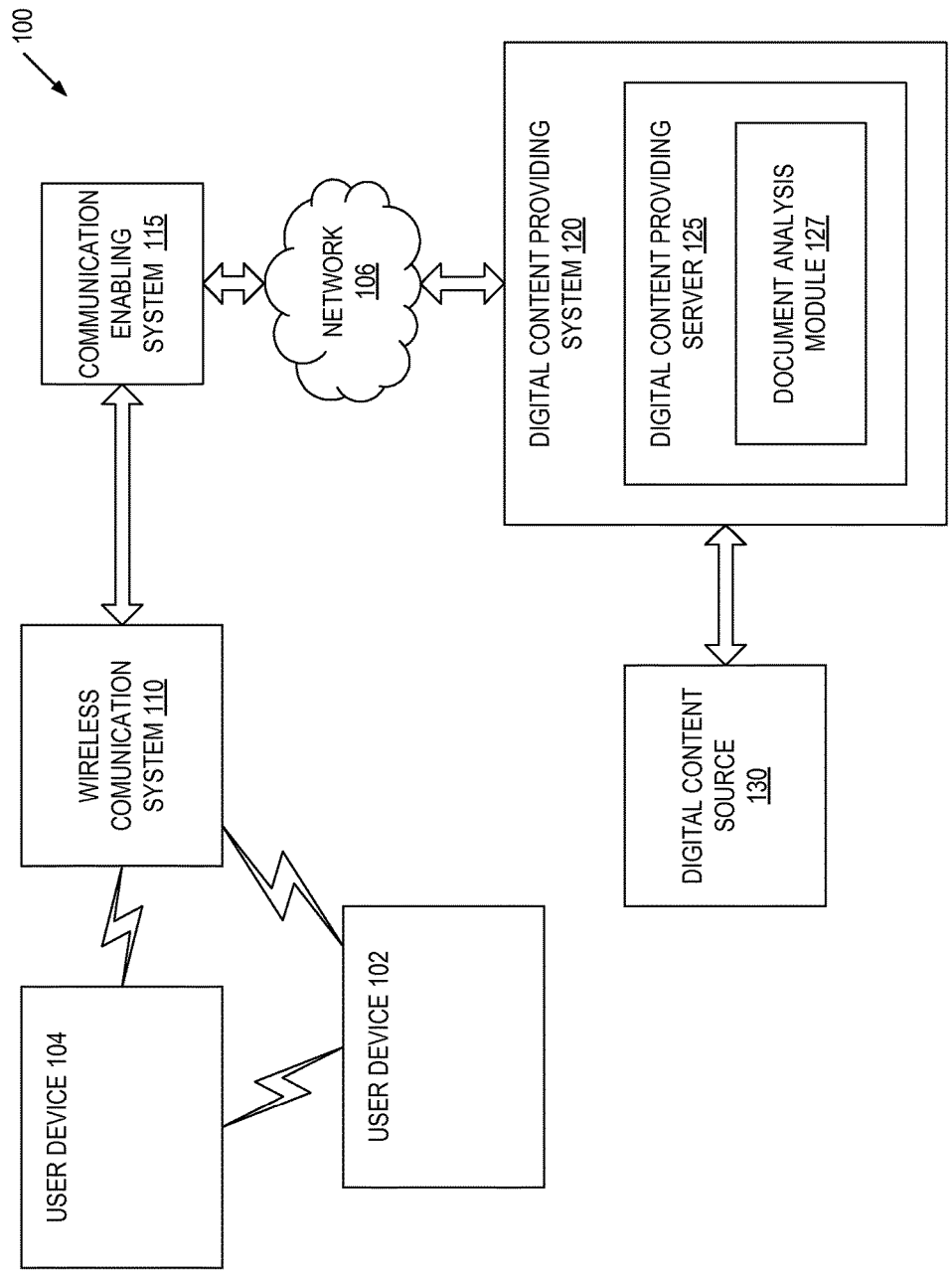
FIG. 2 is a block diagram of an exemplary network architecture, in which embodiments of the present invention may operate.

FIG. 2 is a block diagram of an exemplary network architecture 100, in which embodiments of the present invention described herein may operate. The network architecture 100 may include a digital content providing system 120 and one or more user devices (e.g., electronic devices) 102, 104 capable of communicating with the digital content providing system 120 via a network 106. Network 106 may include, for example, any combination of a public network such as the Internet, a wireless network (e.g., an 802.11n network, an 802.11a network, a WLAN, etc.), a cellular network (e.g., an LTE network, a CDMA network, a WWAN, etc.) and a private network such as a local area network (LAN).

The user devices 102, 104 may be portable computing devices such as electronic book readers or tablet computers (e.g., that include a book reader application). Other examples of portable computing devices include cellular telephones, smart phones, personal digital assistants (PDAs), portable media players, netbooks, laptop computers, and the like. The user devices 102, 104 may also be non-portable computing devices such as a desktop computer, a set-top box associated with a television, a gaming console, and so on. The user devices 102, 104 are variously configured with different features to enable consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), audio files, and multimedia content.

The digital content providing system 120 may provide electronic media items or other digital content to the user devices 102, 104. The digital content providing system 120 may include a network-accessible server-based functionality (digital content providing server 125), various data stores (not shown), and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, the digital content providing server 125 corresponds to an entity which provides electronic media items (e.g., electronic books, digital video, digital audio, etc.) to users upon the users' purchase of the items. In this role, the digital content providing server 125 may essentially act as a bookseller or the like. In other cases, the digital content providing server 125 corresponds to an entity which provides electronic media items to users on a non-fee basis or on the basis of some other type of alternative compensation arrangement. Thus, the term a "provider" of items should be construed broadly to encompass educational institutions, governmental organizations, libraries, nonprofit organizations, retailers, auction services, and so on, or some cooperative combination of any two or more entities.

The digital content providing server 125 may deliver, and the user devices 102, 104 receive, electronic media items (or other media items), search results, upgrades, and/or other information via the network 106. For example, the user devices 102, 104 may download or receive ebooks from the digital content providing server 125. The digital content providing server 125 may also receive various requests (e.g., search queries), instructions and other data from the user devices 102, 104 via the network 106.

Communication between the user devices 102, 104 and the item providing system 120 may be enabled via any communication infrastructure. One example of such an infrastructure includes a combination of a local area network (LAN), a wide area network (WAN), and wireless infrastructure, which allows a user to use the user devices 102, 104 to purchase digital content (e.g., electronic media items) and consume the digital content without being tethered to the digital content providing system 120 via hardwired links. The wireless infrastructure may be provided by one or multiple wireless communications systems, such as wireless communication system 110. The wireless infrastructure may be provided by one or multiple wireless communications systems, such as wireless communication system 110. In one embodiment, wireless communication system 110 may be a wireless fidelity (WiFi) hotspot connected with the network 106. For example, the wireless communication system 110 may use an 802.11a, 802.11b, 802.11c, 802.11g, 802.11n, or 802.11ac communication protocol. In another embodiment, wireless communication system may be a cellular communication system (e.g., an LTE system, a CDMA system, and HSPA+system etc.). In a further embodiment, the wireless communication system 110 may use any number or combination of wireless communication protocols. Wireless communication system 110 may also be a wireless carrier system that can be implemented using various data processing equipment, communication towers, etc. Alternatively, or in addition, the wireless carrier system may rely on satellite technology to exchange information with the user devices 102, 104.

The communication infrastructure may also include a communication-enabling system 115 that serves as an intermediary in passing information between the digital content providing system 120 and the wireless communication system 110. The communication-enabling system 115 may communicate with the wireless communication system 110 (e.g., a wireless carrier) via a dedicated channel, and may communicate with the digital content providing system 120 via a non-dedicated communication mechanism, (e.g., a public Wide Area Network (WAN) such as the Internet).

In addition to wirelessly connecting to wireless communication system 110, user devices 102, 104 may also wirelessly connect to other user devices 102, 104. For example, user device 102 may form a wireless ad hoc (peer-to-peer) network with user device 104 using WiFi, Bluetooth, cellular communication protocols (e.g., LTE, HSPA+, etc.), or other wireless communication protocols.

In one embodiment, digital content providing server 125 may include a document analysis module 127. The document analysis module 127 may analyze electronic media items and may identify different regions and/or types of regions in the electronic media items. For example, the document analysis module 127 may analyze an electronic media item (e.g., an electronic book) and may identify regions of an electronic media item (e.g., divide or segment the pages of the electronic media item into different regions) and may identify or classify each region as having a particular region type (e.g., body text, body text paragraphs, captions, image/graphical regions, chapter headings, headers, footers, footnotes, tables, list items (e.g., individual items of a list), table of contents (TOC) entries, inserts (e.g., text, images and/or other information that is added to the electronic media item, such as commentary from an author or publisher), sidebars (e.g., text, images, and/or other information that are positioned with the sides of the pages in the electronic media item), equations (e.g., math equations, chemical formulas, etc.).

In one embodiment, the document analysis module 127 may use initial sets of rules to analyze the pages in an electronic book. The document analysis module 127 may identify regions and corresponding region types for the pages by applying the rules to the pages of the electronic book (e.g., a rule may indicate that italicized text with a font size of 10 should be classified as a footnote). For example, the set of rules may indicate the character spacing, line spacing, font size, margins, etc, of text that should be identified as a paragraph region. The document analysis module 127 may determine whether the region has the character spacing, line spacing, font size, margins, etc., specified in the set of rules. Each initial set of rules may be associated with a particular region type (e.g., a set of rules is used for identifying body text, another set of rules is used for identifying footnotes, etc.). In one embodiment, the initial sets of rules may be based on typographical feature sets of regions for other electronic books. For example, the initial set of rules for a paragraph region type may include the average line spacing, average font size, and/or average character spacing for paragraph regions identified in one or more other electronic books. In another embodiment, the initial sets of rules may be based on data received from other sources. For example, a publisher may provide initial sets of rules for books that the publisher publishes.

For each region type, the document analysis module 127 may identify a set of regions, such that each region in the set of regions is associated with the same region type (e.g., all of the regions in a first set of regions are classified as footnote regions). Document analysis module 127 may analyze each region in the set of regions to obtain a typographical feature set (e.g., a set having one or more typographical features such as font size, line spacing, character spacing, line length, area of the region, and/or values for the typographical features, etc.) for each region in the set of regions. The document analysis module 127 may perform a cluster analysis using the typographical feature sets for the regions in the set of regions, to obtain one or more clusters (e.g., clusters of regions) for the set of regions. Cluster analysis may refer to any technique, method, or algorithm that may be used to cluster or group data points to identify the relationship between members of the group relative to the other members. Examples of cluster analysis methods or algorithms include but are not limited to, centroid based clustering (e.g., k-means), connectivity based clustering (e.g., hierarchical clustering), distribution based clustering (e.g., expectation-maximization (EM) clustering), density based clustering (e.g., density-based spatial clustering of applications with noise (DBSCAN)), etc. The document analysis module 127 may update the initial set of rules associated with the region type based on the clusters (e.g., may change the line spacing for a rule from 100 pixels to 110 pixels) and may apply the updated rules to the pages of the electronic publication to identify a new set of regions associated with the region type. In one embodiment, the document analysis module 127 may update the initial set of rules based on the centroids of the clusters (e.g., a point that is at the center of the cluster, a point which is the average of the values in the cluster, etc.). For example, the document analysis module 127 may obtain values for the rules by obtaining typographical feature values for a centroid of a cluster. The document analysis module 127 may iterate (e.g., repeat) these operations (e.g., identifying a set of regions for a region type, performing cluster analysis on the set of regions to obtain one or more clusters, updating the initial rules based on the clusters, and reapplying the updated rules to the pages to identify a new set of regions) until the clusters for a region type converge (e.g., the clusters stop changing and/or each cluster meets a threshold size).

In one embodiment, the document analysis module 127 may automatically divide pages of an electronic publication into different regions and may automatically classify or identify a region type for each region. This may allow physical documents such as books (e.g., hard copy books which have been scanned as images or books in portable document format (PDF)) to be converted into different electronic formats and distributed as electronic media items.

In one embodiment, the document analysis module 127 may also receive user input updating or correcting the size or a region and/or the region type of a region. For example, the document analysis module 127 may analyze pages of an electronic media item and may classify or identify a region as a footnote. However, the region may actually be an image caption. A user may provide user input (e.g., mouse selections or clicks, keyboard input, touch screen input, stylus input, etc.) to update or correct the region type of the region from footnote to image caption. The document analysis module 127 may analyze the regions that have been updated or corrected by the user to obtain typographical feature sets for the correct regions. The document analysis module 127 may update one or more rules and may reapply the updated rules to the pages of the electronic publication to identify regions and region types in the pages of the electronic media item. For example, if a user provides user input correcting multiple regions to be classified as a body text paragraph, the document analysis module 127 may obtain typographical feature sets (e.g., one or more of font size, line spacing, indentation, etc.) to the corrected regions and may update the rules used to identify body text paragraphs, using the typographical feature sets for the corrected regions.

In one embodiment, the document analysis module 127 may analyze each page in the electronic media item and may compare each page with a library or a set of previously processed pages (e.g., template pages). The library or set of previously processed pages (e.g., template pages) may be pages of one or more electronic media items which have been correctly divided into different regions and/or region types. For example, a previously processed page may be a page where the regions (e.g., sizes, shapes, and/or locations of the regions) and their corresponding region types have been verified by a human user or operator. The document analysis module 127 may use morphology (e.g., mathematical morphology or binary morphology) to analyze the pages in the electronic media item. For example, the document analysis module 127 may perform one or more morphological operations (e.g., morphological dilations, morphological erosions, etc.) on a page to divide the page into different regions. Morphological erosions may shrink the size of the regions in the page which may break regions that are linked together, into separate regions. For example, morphological erosions may be used to break up two paragraphs that were previously considered one single region, into two separate regions. Morphological dilations may increase the size of the regions and may be used to combine multiple regions into a single region. For example, morphological dilations may be used to combine multiple sentences on a page into a single paragraph region. The document analysis module 127 may determine the size, shapes, and/or locations of the regions (e.g., the size, shape and/or location of a bounding box around the region) after performing the morphological operations (e.g., morphological erosions and/or morphological dilations) on the page of the electronic publication.

The document analysis module 127 may match a layout of the regions in the analyzed page (e.g., the sizes, shapes and/or locations of all the regions in a page) to a layout of a template page. The document analysis module 127 may use the regions and the regions types of the template page to classify and/or identify the region types of the analyzed page. For example, for a certain region having a size, shape and/or location/position on the analyzed page, the document analysis module 127 may identify the region type for the certain region based on another region on a template page where the other region has a similar size, shape and/or location on the template page.

In one embodiment, the document analysis module 127 may analyze or process electronic media items currently offered to users by digital content providing server 125 or for newly received electronic media items from digital content source 130 before they are provided to a user. Digital content source 130 may be, for example, a publisher, author, creator, etc. of electronic media items or other digital content that provides the digital content to be distributed by digital content providing system 120. Embodiments of the document analysis module 127 are described in greater detail below with reference to FIGS. 3-9.

Figure 3:
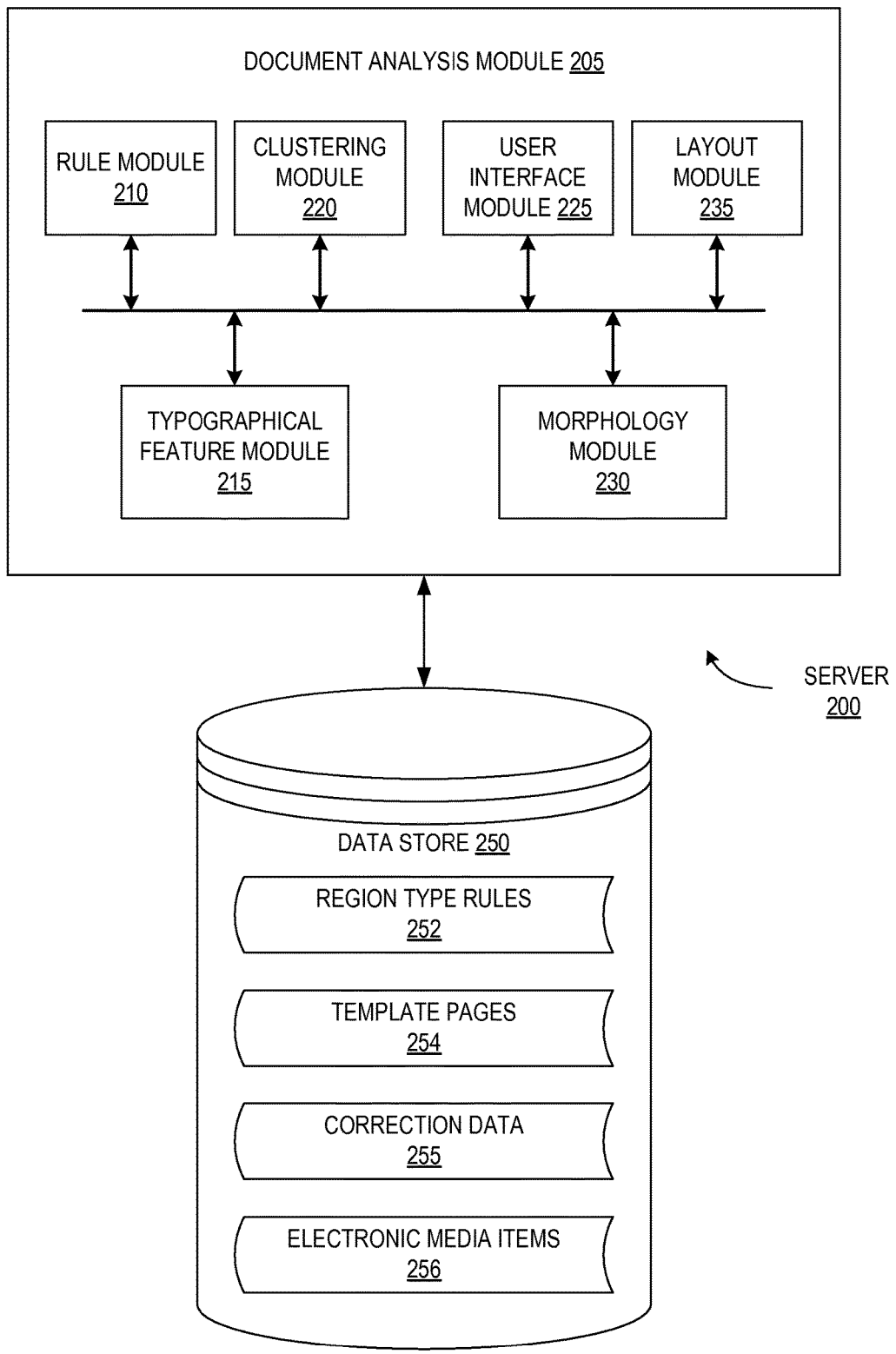
FIG. 3 is a block diagram illustrating a document analysis module, according to one embodiment.

FIG. 3 is a block diagram of one embodiment of a document analysis module 205 that may be included in a server 200 (e.g., digital content providing server 125 of FIG. 2 or a server that is separate from the digital content providing system 120 of FIG. 2). In one embodiment, server 200 includes a rule module 210, a typographical feature module 215, a clustering module 220, a user interface module 225, a morphology module 230, and a layout module 235. In one embodiment, document analysis module 205 is connected to a data store 250, which may be a file system, database or other data management layer resident on a data storage device such as a disk drive, RAM, ROM, database, etc. Data store 250 may include region type rules 252, template pages 254, correction data 255, and electronic media items 256. The document analysis module 205 may analyze one or more electronic media items 256 stored in the data store 250 to identify regions and/or region types for the pages in the electronic media items 256.

In one embodiment, the region type rules 252 may include one or more rules which may be applied to the pages of an electronic media item (e.g., used on the pages of an electronic media item) to identify regions in the pages and the region type for those regions. For example, a rule may indicate that text which has a font size of 10, which is italicized, and which has a line spacing (e.g., the spacing between two lines) of 50 pixels, should be classified or identified as a footnote region (e.g., the region type is "footnote"). In another example, a rule may indicate that text which has a font size of 12, which has a line spacing of 100 pixels, and is not italicized or bolded should be classified or identified as a paragraph of body text (e.g., a paragraph region). In one embodiment, the region type rules may be updated and/or modified by the document analysis module 205. For example, a rule may be modified based on a cluster analysis for a set of regions having the same region type (e.g., based on a cluster analysis of all paragraph regions, or all footnote regions). In another example, a rule may be modified based on user input correcting a size and/or type of a region.

The template pages 254 may include a set or a library of template pages (e.g., previously processed and/or verified pages). The template pages may be pages which include regions and/or region types which have been verified to be correct by an end user or a designated operator (e.g., by a quality control operator). The template pages 254 may include layout or formatting information for the regions on the page and region type information for the regions on the page. For example, a template page may include data indicative of the size, shape, and/or location of a particular region, and the region type for the particular region.

The correction data 255 may include typographical feature sets (e.g., information indicating one or more of line spacing, font size, character spacing, etc.) for regions of the electronic media item which have been updated and/or corrected by a user. For example, a user may correct the region type for a region. The correction data may include a typographical feature set (e.g., font size, character spacing, line spacing, etc.) for the corrected region. In one embodiment, the correction data 255 may be used to update the region type rules 252. For example, a user may correct or reclassify a region as a footnote region and the corrected footnote region may have a line spacing of 75 pixels. The correction data 255 (e.g., the line spacing of 75 pixels) may be used to update one or more rules which are used to identify or classify footnote regions.

In one embodiment, the rule module 210 may apply or use the region type rules 252 to identify one or more regions in the pages of an electronic media item and to identify a corresponding region type for each of the regions. For example, if a rule indicates that text which is bolded, underlined, and has a font size greater than 16 should be classified as chapter headings (e.g., a chapter heading region), the rule module 210 may analyze all the pages of the electronic media item to identify regions of the electronic media item which satisfy (e.g., match) the rule. In one embodiment, the rule module 210 may identify regions and their corresponding region types using an initial set of rules. As the initial set of rules is updated or modified (e.g., when a rule is updated based on a cluster analysis or based on a user correction), the rule module 210 may apply or use the updated rules to identify regions (e.g., new regions) based on the updated rules.

In one embodiment, the typographical feature module 215 may be used to obtain a typographical feature set for a region. For example, a region may be classified or identified as a paragraph of body text. The typographical feature module 215 may be used to obtain one or more typographical features (e.g., a typographical feature set) for the region. For example, a typographical feature set for a region may be represented as follows: [line spacing||font size||formatting information (e.g., bold, underlined, etc.)|| character spacing] (e.g., [50 pixels||12 point font||bolded||5 pixels]). Table 1 below includes an exemplary list of typographical features which may be included in a typographical feature set. In other embodiments, a typographical feature set may include typographical features which are not included in Table 1.

TABLE 1

List of Exemplary Typographical Features

| | |
|---|---|
| the total count of regions in the book | line spacing |
| the total count of lines in the book | line length |
| the total count of tokens in the book | region spacing (e.g., space between regions) |
| the total count of chars in the book. | odd page normal left margin |
| the total count of text regions in the book | even page normal left margin |
| the total count of text regions with normal (horizontal) line orientation | odd page normal right margin |
| the total count of text regions with vertical line orientation | even page normal right margin |
| the total count of image regions in the book | odd page normal start margin |
| the total count of table regions in the book | even page normal start margin |
| the total count of blank pages in the book | odd page vertical left margin |
| the overlapped of area of all regions | even page vertical left margin |
| total region area (e.g., the size of the region) | odd page vertical right margin |
| font size | even page vertical right margin |
| Raw height of the chars | odd page vertical start margin |
| page width | even page vertical start margin |
| page height | indentation |
| token (E.g., character) spacing | caption |

In one embodiment, the clustering module 220 may perform a cluster analysis for each type of region (e.g., perform a cluster analysis on all regions of the same region type using typographical feature sets for the regions). As discussed above, the clustering module 220 may use a variety of different cluster analysis methods, techniques and/or algorithms including but not limited to, centroid based clustering (e.g., k-means), connectivity based clustering (e.g., hierarchical clustering), distribution based clustering (e.g., expectation-maximization (EM) clustering), density based clustering (e.g., density-based spatial clustering of applications with noise (DBSCAN)), etc. The clustering module 220 may cluster regions into groups or clusters of regions. In one embodiment, each region in a cluster may have a typographical feature set which may be similar to typographical feature sets of other regions in the cluster (e.g., the values of the typographical feature sets are close to each other). In another embodiment, each region in a cluster may have a typographical feature set that has values within a certain threshold of a desired value (e.g., the font size in each feature set is within one of the font size 12). The clustering module 220 may be used each time a set of regions is identified for a region type. For example, as discussed above, sets of regions may be identified using initial sets of rules, and clusters may be obtained for each set of regions. The initial sets of rules may be updated based on the clusters and new set of regions may be identified using the updated rules. The cluster module 220 may be used to perform cluster analysis on the new set of regions for the region type. In one embodiment, the cluster module 220 may perform cluster analysis until the clusters of regions for the type of region converge. For example, the cluster module 220 may perform cluster analysis on footnote type regions until the clusters of footnote type regions stop changing (e.g., the regions contained in each cluster do not change). In another embodiment, the cluster module 220 may perform cluster analysis on paragraph regions until all of the clusters for paragraph regions are above a certain threshold size (e.g., until there are at least 10 regions in a cluster or the number of regions in the cluster is a certain percentage of the total number of regions across all clusters).

The user interface module 225 may receive user input updating and/or correcting one or more regions in an electronic media item. For example, the document analysis module 205 may analyze/process an electronic media item and identify regions and corresponding region types for the regions. The user interface module 225 may display the regions and their corresponding type to a user. For example, the user interface module 225 may display a page of the electronic media item and may display boxes (e.g., bounding boxes) around the regions in the page. The user may correct and/or update one or more of the regions (e.g., modify the size of a region by modifying the bounding box or divide a bounding box into multiple bounding boxes for multiple regions) by providing user input via the user interface. The user may also correct a region type for a region (e.g., re-classify or re-identify a region from a footnote region to an image caption region). The document analysis module 205 may obtain typographical feature sets for the regions corrected or updated by the user, using the user interface module 225 and may store these typographical feature sets as part of the correction data 255. In one embodiment, the document analysis module 205 may obtain typographical feature sets for the regions corrected or updated by the user after a certain amount of length of the electronic media item has been verified and/or corrected by the user. For example, the document analysis module 205 may obtain typographical features sets after the user has corrected and/or verified at least one chapter, or at least one quarter of the length of the book.

In one embodiment, the morphology module 230 may perform morphological operations on one or more pages of the electronic media item to extract visual feature of a page and to identify regions on the one or more pages. The morphology module 230 may perform any number of morphological operations including, but not limited to, dilation, erosion, opening, closing, etc.

In one embodiment, the layout module 235 may compare a page that has been processed by the morphology module 230 (e.g., to identify regions on the page) and may compare the page to one or more template pages 254. The layout module 235 may compare the size, shape, and/or locations of the regions (e.g., the layout of the regions) identified in a current page with the sizes, shapes and/or locations of regions (e.g., the layout of the regions) on template pages 254. When the layout module 235 finds a template page that has a similar layout of regions to the current page, the layout module 235 may use the region types on the template page to identify the region types on the current page. For example, if the top left region of a template page is identified as a paragraph and the top left region of the current page is similar in size, shape, and/or position to the top left region of the template page, the layout module 235 may identify the top left region of the current page as a paragraph region. In one embodiment, the layout module 235 may use a variety of techniques, methods and/or algorithms to find template pages which are similar to the current page. For example, the layout module 235 may use visual keywords based indexing, approximate nearest-neighbor searching, and matching at a connected component level.

Figure 4:
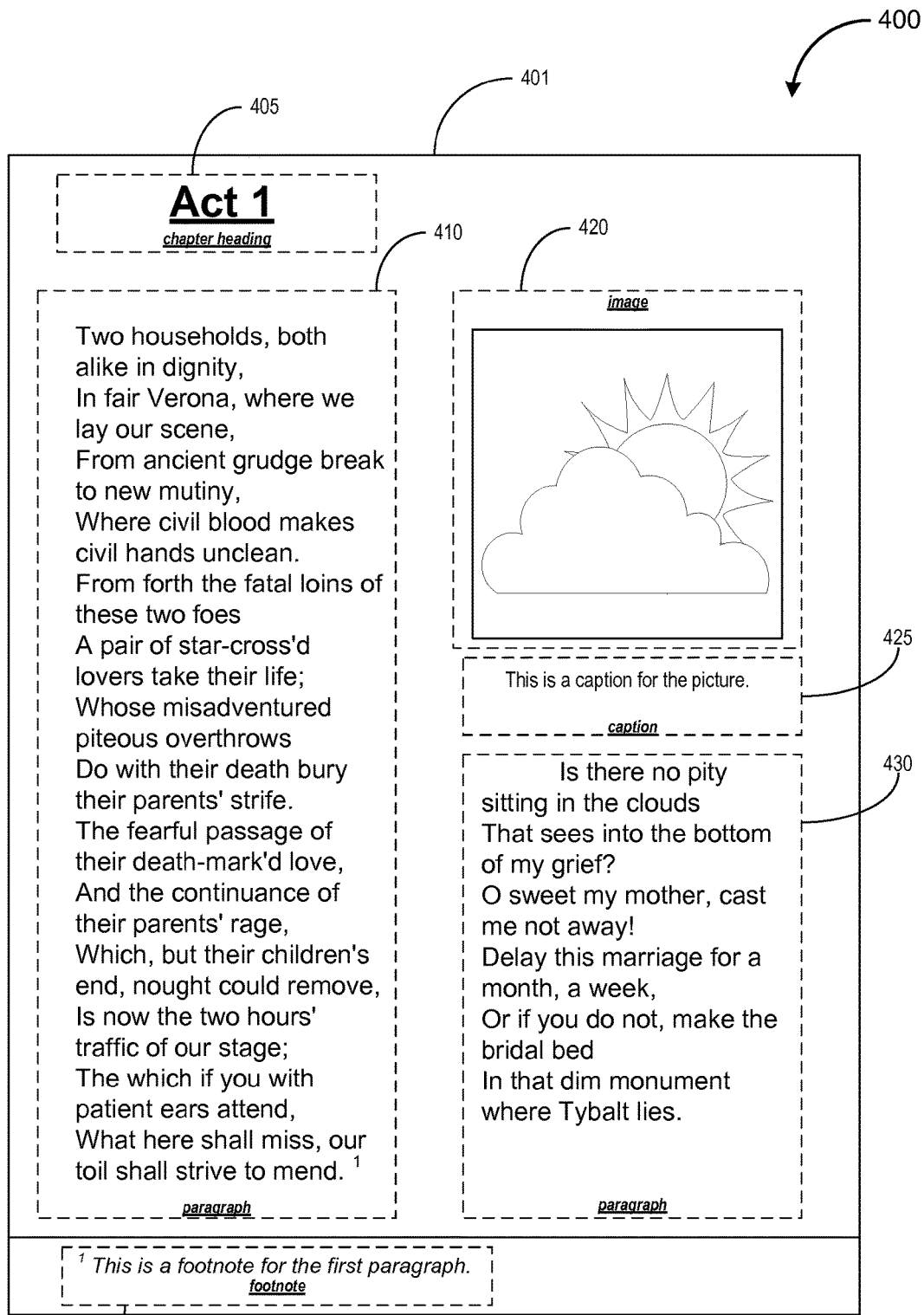
FIG. 4 is a diagram illustrating a graphical user interface (GUI) including a page from an electronic media item, according to another embodiment.

FIG. 4 is a diagram illustrating a graphical user interface (GUI) 400, including an exemplary page from an electronic media item, according to another embodiment. The GUI 400 may be provided and/or displayed by a document analysis module (e.g., document analysis module 127 shown in FIG. 2) after user input correcting the regions in the page 301 (shown in FIG. 1) has been received. The GUI 400 displays a corrected page 401 of an electronic media item. Similar to FIG. 1, the pages of the electronic media item may have been processed or analyzed by the document analysis module. Region 405 is identified as a chapter heading region. Region 410 is identified as a paragraph region. Region 415 is has been corrected (e.g., via user input received by the GUI 400) and is correctly identified as a footnote region. Region 420 is identified as a graphic or image region. Region 425 has been added (e.g., via user input received by the GUI 400) and has been identified by the user as a caption region. Region 430 has been corrected and no longer includes the caption for the image.

Figure 5:
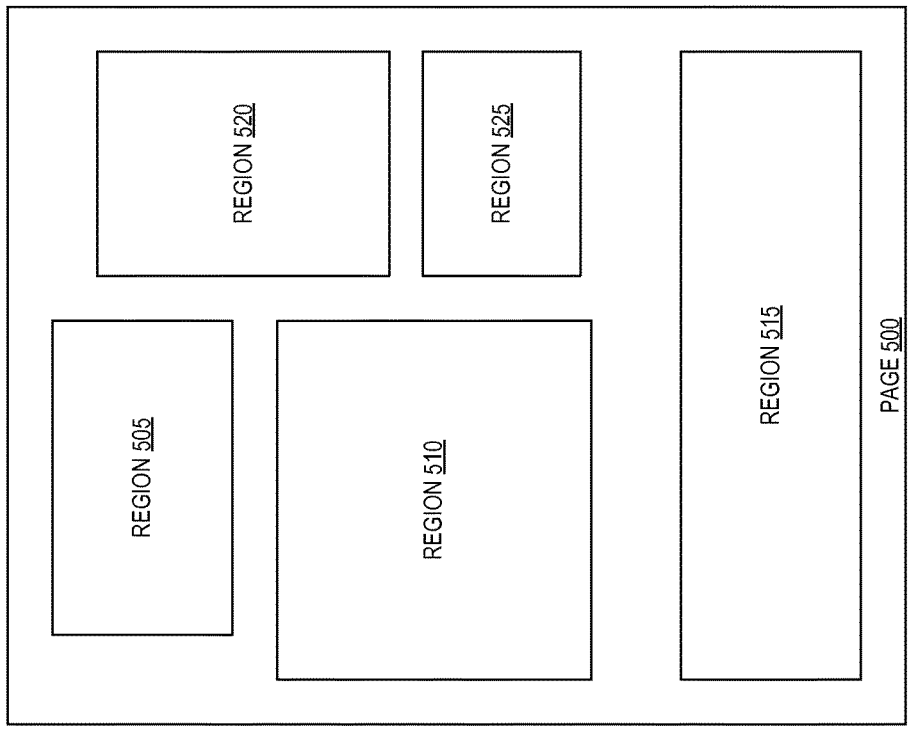
FIG. 5 is a diagram illustrating a page of an electronic media item after the page 500 is processed by a document analysis module to identify regions on the page.

FIG. 5 is a diagram illustrating an exemplary page 500 of an electronic media item after the page 500 has been processed by a document analysis module to identify regions on the page 500, in accordance with some embodiments. The page 500 includes regions 505, 510, 515, 520, and 525. Although regions of the page (e.g., regions 505 through 525) have been identified, the types of the regions have not been identified. The page 500 may be compared to a template page (e.g., template page 600 discussed below in conjunction with FIG. 6) to identify the regions types of the regions 505, 510, 515, 520, and 525.

Figure 6:
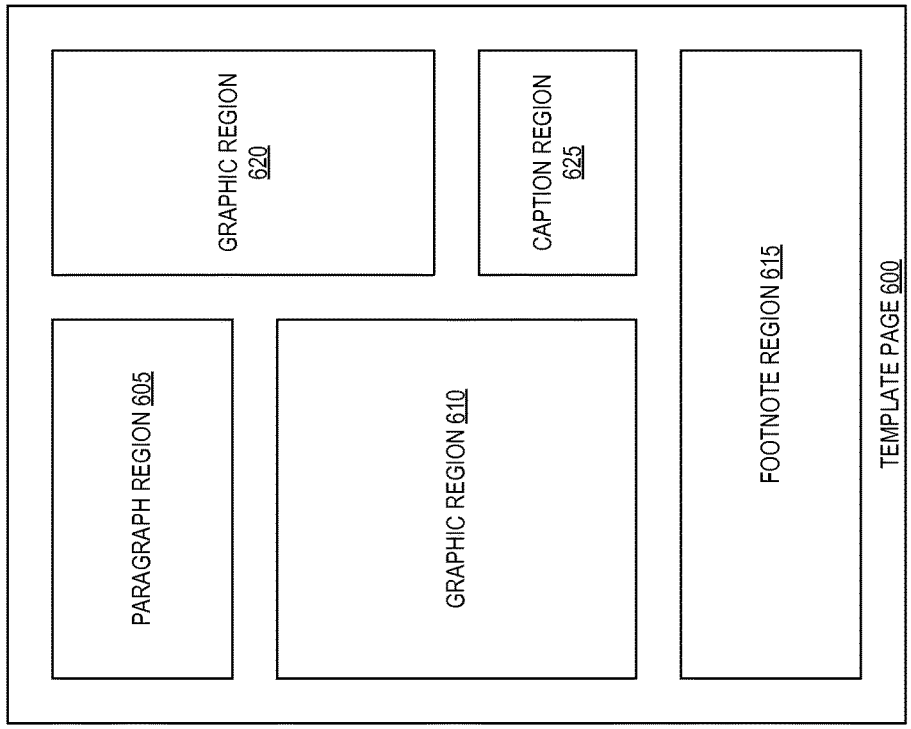
FIG. 6 is a diagram illustrating a template page 600.

FIG. 6 is a diagram illustrating an exemplary template page 600. The template page may be a page which was previously processed by the document analysis module and/or verified/corrected by a user (e.g., a human operator). The page 600 includes a paragraph region 605, a graphic region 610, a footnote region 615, a graphic region 625, and a caption region 625.

Referring to both FIGS. 5 and 6, a document analysis module may determine the size, shape, and/or position (e.g., X-Y coordinates) of the regions 505 through 525 in the page 500. The document analysis module may also determine the size, shape, and/or position of the paragraph region 605, the graphic region 610, the footnote region 615, the graphic region 625, and the caption region 625 of the page 600. The document analysis module may compare the size, shape, and/or position of the regions in the page 500 with the regions in the page 600 (e.g., may compare the layout of the page 500 with the layout of the page 600). For example, the region 505 is similar in size to paragraph region 605, has the same shape as paragraph region 605, and has approximately the same location (e.g., both are in the top left hand corner). Region 510 is similar in size, shape, and/or location to graphic region 610, region 515 is similar in size, shape, and/or location to footnote region 615, region 520 is similar in size, shape, and/or location to graphic region 620, and region 525 is similar in size, shape, and/or location to caption region 625. The document analysis module may identify the region types for the regions 505 through 525 using the corresponding regions in the page 600 which are similar to the regions 505 through 525 if the layout for the page 500 is similar to the layout for the page 600. For example, because the layout for page 500 is similar to the layout for page 600, the document analysis module may identify region 505 as a paragraph region, may identify region 510 as a graphic region, may identify region 515 as a footnote region, may identify region 520 as a graphic region, and may identify region 525 as a caption region.

Figure 7:
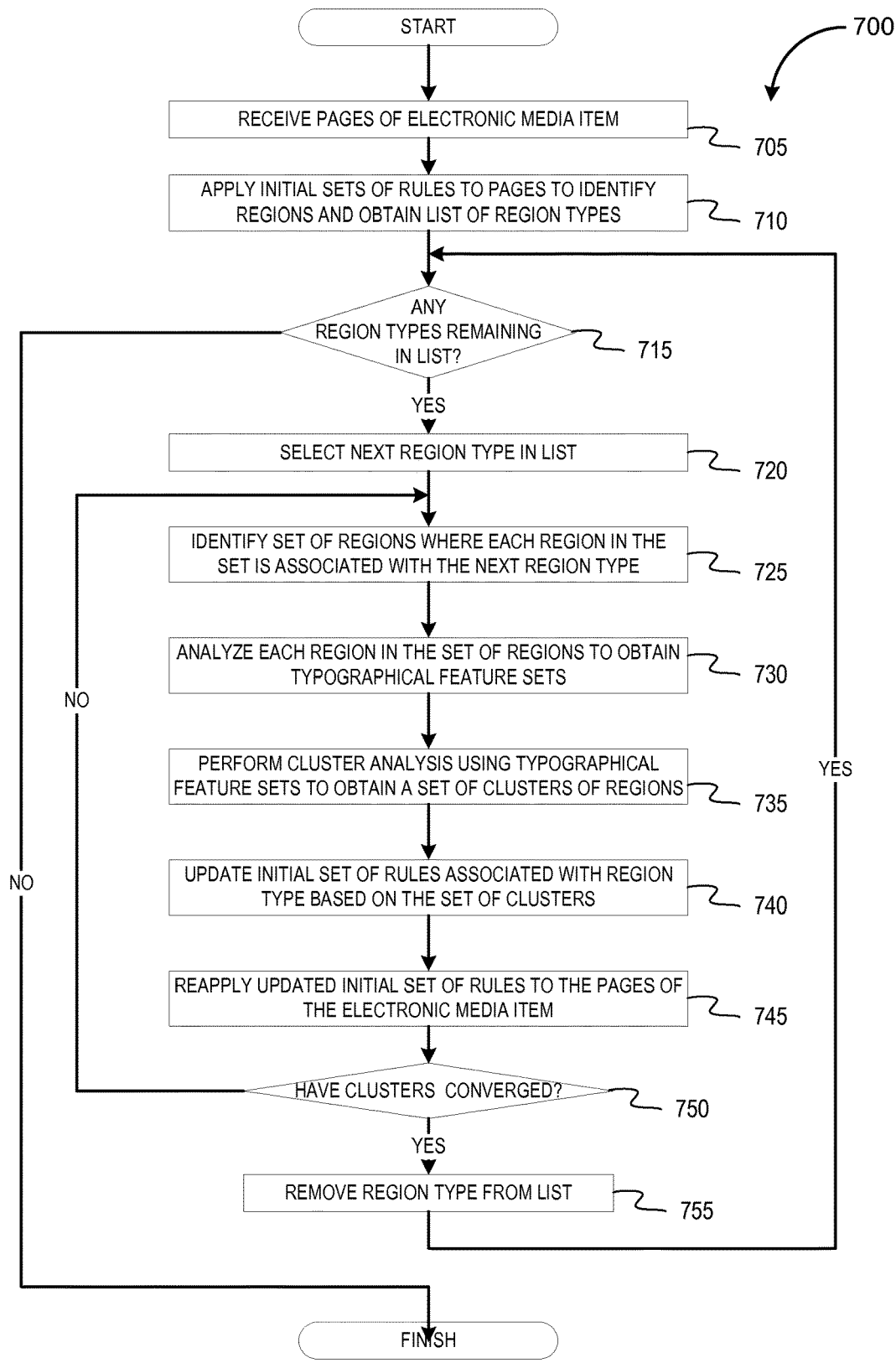
FIG. 7 is a flow diagram illustrating a method for analyzing an electronic media item to identify regions and/or region types in the electronic media item, according to one embodiment.

FIG. 7 is a flow diagram illustrating a method 700 for analyzing an electronic media item to identify regions and/or region types in the electronic media item, according to one embodiment. The method 700 may be performed by processing logic that comprises hardware (e.g., circuitry, dedicated logic, programmable logic, microcode, etc.), software (e.g., instructions run on a processor to perform hardware simulation), or a combination thereof. The processing logic may be configured to perform document analysis. In one embodiment, method 700 may be performed by a document analysis module, as shown in FIGS. 2 and 3.

Referring to FIG. 7, the method 700 starts by receiving pages of an electronic media item at block 705. At block 710, the method 700 applies initial sets of rules to the pages to initially identify regions and region types in the pages, and to obtain a list of the region types in the electronic media item. For example, one electronic media item may have only have a table of contents region and paragraph regions but another electronic media item may have paragraph regions, footnote regions, image regions, and caption regions. In one embodiment, each region has a region type (e.g., each region is associated with a region type). Each initial set of rules may be associated with a region type (e.g., each initial set of rules is used to identify regions having the region type). At block 715, the method 700 determines whether there are any region types remaining in the list of region types. If there are no region types remaining in the list of region types, the method 700 ends. If there is at least one region type remaining in the list of region types, the method 700 proceeds to block 720. At block 720, the method 700 selects a next region type (e.g., the method 700 may have previously selected footnote regions and may select paragraph regions next). At block 725, the method 700 identifies a set of regions where each region is associated with the next region type (e.g., identifies all regions which have been identified as paragraph regions). At block 730, the method analyzes each region in the set of regions to obtain typographical feature sets. Each region in the set of regions may be associated with a typographical feature set. At block 735, the method 700 performs cluster analysis using the typographical feature sets to obtain a set of clusters of regions. At block 740, the method 700 updates the initial set of rules for the next region type based on the set of clusters of regions (e.g., updates the rules used to identify paragraph regions). At block 745, the method 700 reapplies the updated initial set of rules to the pages to identify a new set of regions.

At block 750, the method 700 determines whether the set of clusters has converged (e.g., whether the set of clusters stops changing or whether each cluster has a minimum size). If the set of clusters has converged, the method 700 proceeds to block 755 where the method 700 removes the region type from the list of region types and proceeds to block 715 to determine if there are any region types remaining in the list of region types. If the set of clusters has not converged, the method 700 proceed back to block 725. For reach region type (e.g., for paragraph regions, footnote regions, caption regions, chapter heading regions, etc.), the method 700 may re-iterate (e.g., loop) through the blocks 725 to 755 until the set of clusters for the region type converge.

In one embodiment, the method 700 may not perform steps 715 through 755 sequentially as shown in FIG. 7. For example, the method 700 may not perform cluster analysis select one region type, perform cluster analysis and update the rules for the region type, and select a next region type. Instead, the method 700 may perform cluster analysis for multiple regions types (e.g., paragraph regions, footnote regions, etc.) in parallel. For example, the method 700 may perform cluster analysis and update rules for paragraph regions, footnote regions, and caption regions, in parallel.

Figure 8:
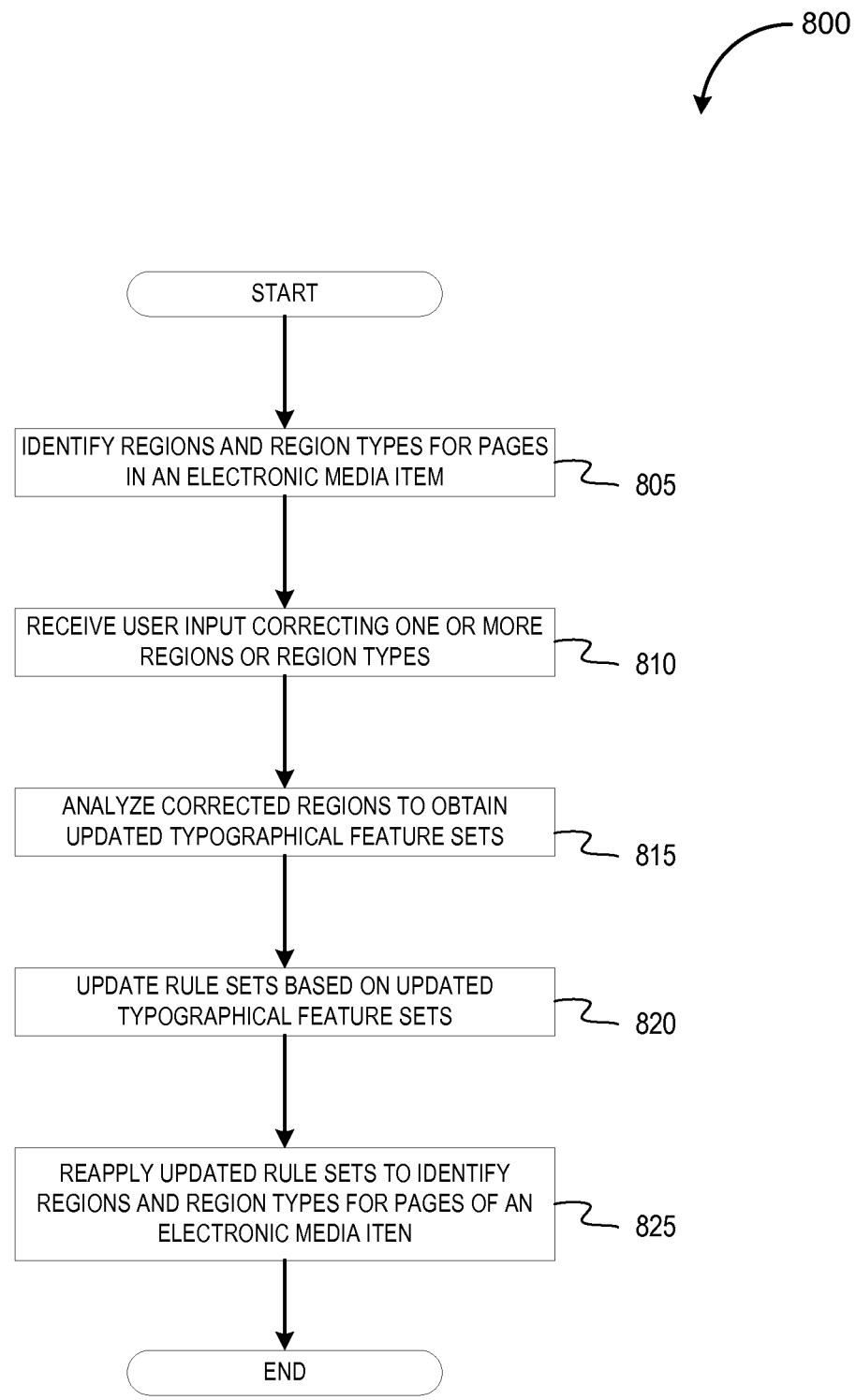
FIG. 8 is a flow diagram illustrating a method for analyzing an electronic media item to identify regions and/or region types in the electronic media item, according to another embodiment.

FIG. 8 is a flow diagram illustrating a method for analyzing an electronic media item to identify regions and/or region types in the electronic media item, according to another embodiment. The method 800 may be performed by processing logic that comprises hardware (e.g., circuitry, dedicated logic, programmable logic, microcode, etc.), software (e.g., instructions run on a processor to perform hardware simulation), or a combination thereof. The processing logic is configured to maintain a communication channel. In one embodiment, method 700 may be performed by a document analysis module, as shown in FIGS. 2 and 3. In one embodiment, the method 800 may be performed after the method 700 shown in FIG. 7.

Referring to FIG. 8, the method starts at block 805, where the method 805 identifies regions and/or region types for pages in an electronic media item (e.g., performs the operations of the method 700). At block 810, the method 800 receives user input correcting one or more of the regions and/or region types associated with the one or more regions. At block 815, the method 800 analyzes the corrected regions to obtain updated typographical feature sets for the corrected regions. In one embodiment, the method 800 may analyze the corrected regions after a certain portion of the electronic media item has been reviewed and/or corrected by a user. For example, the method 800 may not start analyzing the corrected regions until at least one full chapter or one third of the electronic media item has been reviewed or corrected by the user. At block 820, the method 800 updates the rule sets based on the updated typographical features. For example, if footnote regions and chapter heading regions were corrected by a user, the method 800 may update the rules sets used to identify footnote regions and chapter heading regions. At block 825, the method 800 reapplies the updated rule sets to the pages of the electronic media item to identify regions and/or region types.

Figure 9:
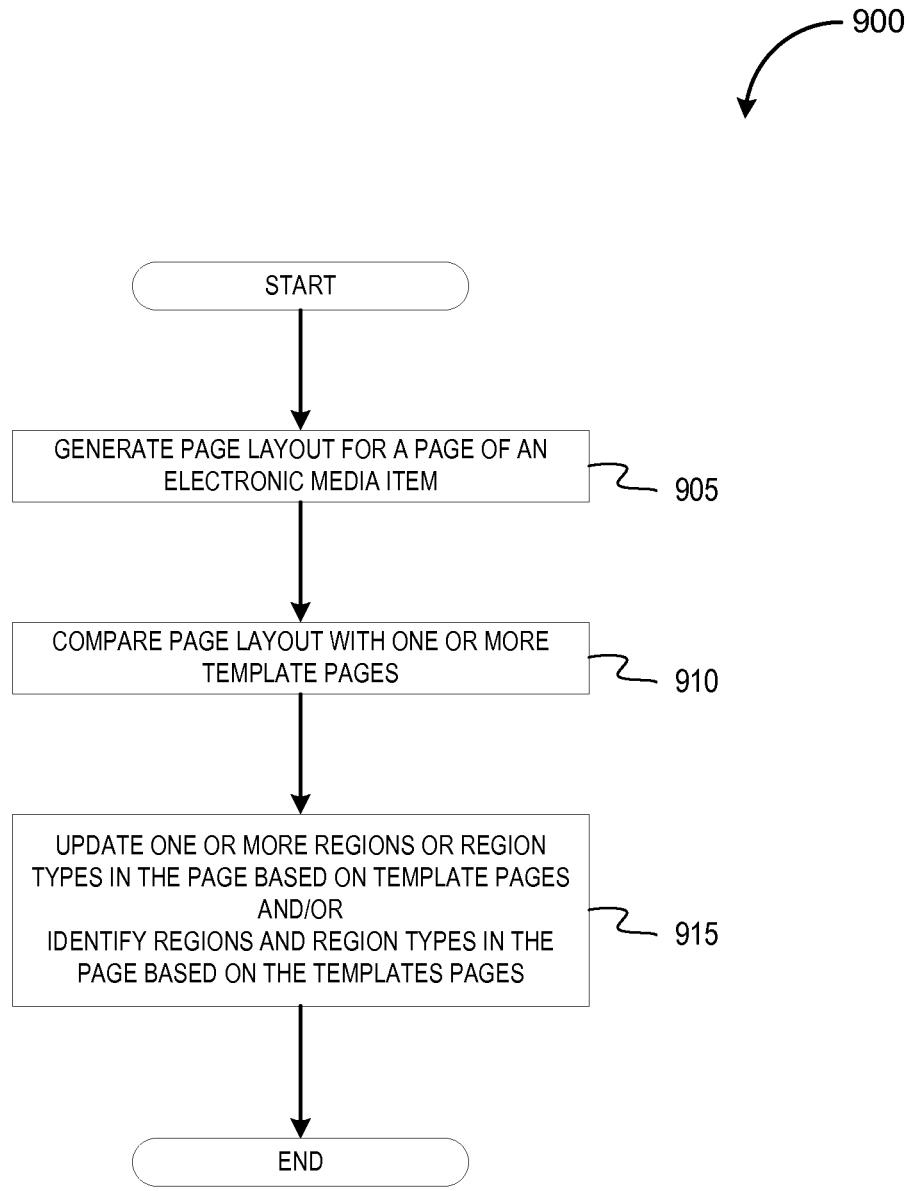
FIG. 9 is a flow diagram illustrating a method for analyzing an electronic media item to identify regions and/or region types in the electronic media item, according to a further embodiment.

FIG. 9 is a flow diagram illustrating a method 900 for analyzing an electronic media item to identify regions and/or region types in the electronic media item, according to a further embodiment. The method 900 may be performed by processing logic that comprises hardware (e.g., circuitry, dedicated logic, programmable logic, microcode, etc.), software (e.g., instructions run on a processor to perform hardware simulation), or a combination thereof. The processing logic is configured to maintain a communication channel. In one embodiment, method 900 may be performed by a document analysis module, as shown in FIGS. 2 and 3. The method 900 may be performed after the method 700 shown in FIG. 7 and/or the method 900 may be performed independently, by itself.

The method 900 starts at block 905 where the method 900 generates a page layout for a page of an electronic media item. For example, the method 900 may use morphological operations to identify different regions and may obtain the size, shape, and/or location of the different regions. At block 910, the method 900 compares the layout of the page with layouts of template pages, which have been verified and/or corrected by a user. At block 915, the method 900 updates one or more regions and/or region types based on the template pages and/or identifies regions and region types in the page based on the template pages. For example, if the method 900 is performed after the method 700, the method 900 may update the regions or region types identified by the method 700. If the method 900 is performed independently (e.g., not performed in conjunction with other methods), the method 900 may identify regions and region types in the page, based on the template pages.

Figure 10:
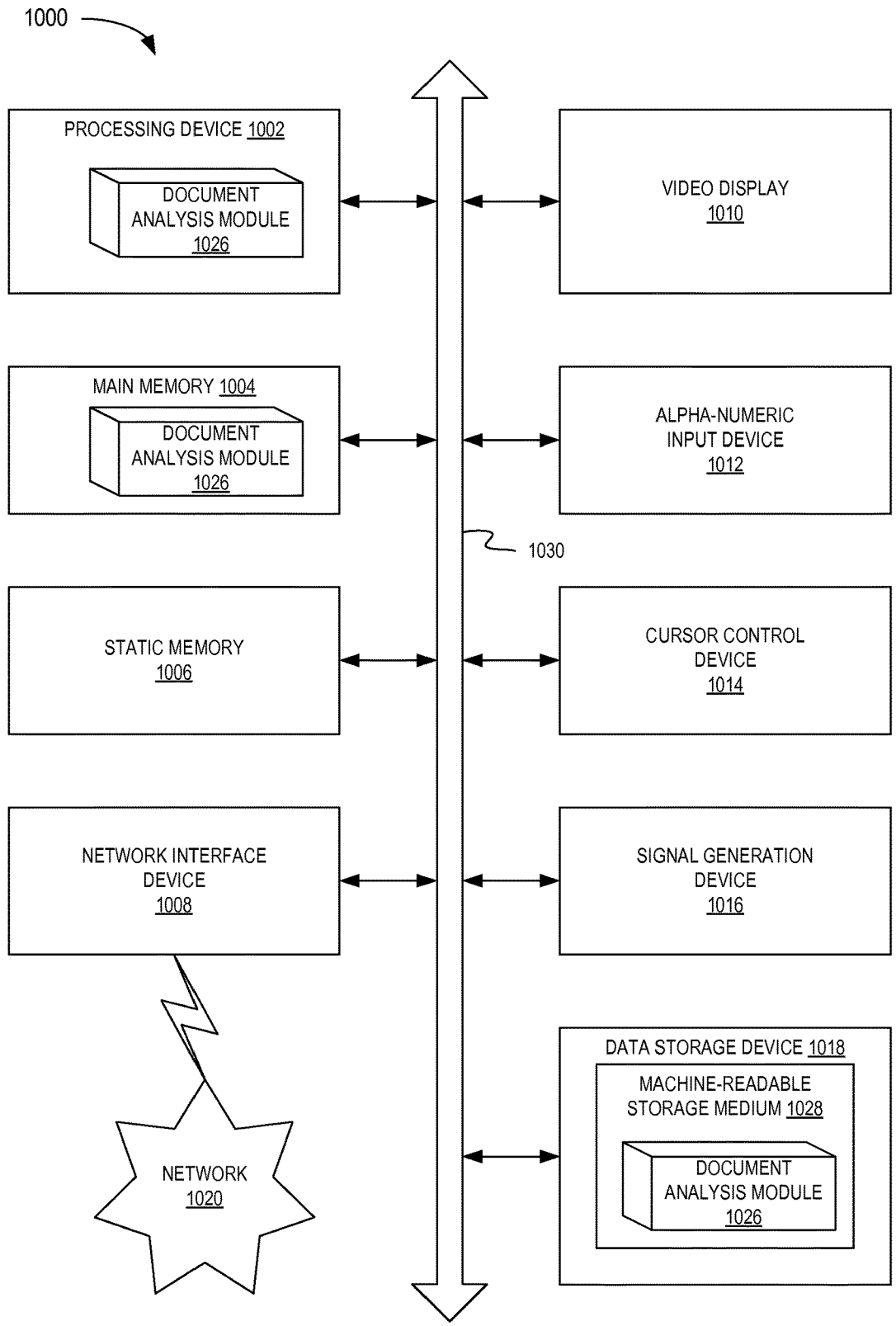
FIG. 10 is a block diagram illustrating one embodiment of a computer system, according to an embodiment.

FIG. 10 illustrates a diagrammatic representation of a machine in the exemplary form of a computer system 1000 within which a set of instructions, for causing the machine to perform any one or more of the methodologies discussed herein, may be executed. The system 1000 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device (e.g., a processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1018, which communicate with each other via a bus 930.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute the document analysis module 1026 for performing the operations and steps discussed herein.

The computer system 1000 may further include a network interface device 1008 which may communicate with a network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a computer-readable medium 1028 on which is stored one or more sets of instructions (e.g., instructions document analysis module 1026) embodying any one or more of the methodologies or functions described herein. The document analysis module 1026 may also reside, completely or at least partially, within the main memory 1004 and/or within the processing device 1002 during execution thereof by the computer system 1000, the main memory 1004 and the processing device 1002 also constituting computer-readable media. The instructions may further be transmitted or received over a network 1020 via the network interface device 1008.

While the computer-readable storage medium 1028 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "applying," "identifying," "providing," "receiving," "generating," "analyzing," "calculating," "generating," "updating," "reapplying," "iterating," "closing," "downloading," "performing," "comparing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    applying predetermined initial sets of rules to an electronic media item to identify content regions within the electronic media item, wherein a first content region is identified as a first region type of a plurality of region types based, at least in part, on a conformance of the first content region to a first predetermined set of rules corresponding to the first region type, the first predetermined set of rules specifying a combination of typographical features used to identify the first region type; and
    for the first region type:
        identifying a set of regions of the first region type, wherein the first content region and a second content region in the set of regions are associated with the first region type;
        analyzing the set of regions to determine a first typographical feature set for the first content region;
        analyzing the set of regions to determine a second typographical feature set for the second content region;
        performing a cluster analysis to identify a cluster of regions from the set of regions, the cluster comprising the first content region and the second content region, where the first typographical feature set and the second typographical feature set comprise values that are within a threshold of a desired value for the cluster;
        updating the first predetermined set of rules corresponding to the first region type to account for typographical feature values determined from a centroid of the cluster of regions to generate a first updated set of rules; and
        applying the first updated set of rules to the electronic media item to identify one or more regions associated with the first region type.

2. The method of claim 1, wherein the first typographical feature set comprises data indicative of one or more of: font size, line spacing, line length, token spacing, margin size, indentation, or region area.

3. The method of claim 1, wherein the first region type comprises one or more of: a chapter heading, a graphic, a body text, a header, a footer, a table, a list item, a footnote, a table of contents entry, or an equation.

4. The method of claim 1, further comprising:
    receiving user input correcting one or more regions;
    analyzing the corrected one or more regions to obtain updated typographical feature sets;
    modifying the first updated set of rules based on the updated typographical feature sets to generate a second updated set of rules; and
    applying the second updated set of rules to the electronic media item to identify one or more regions associated with the first region type.

5. The method of claim 1, wherein applying the first updated set of rules comprises:
    identifying one or more regions that have typographical features that satisfy one or more rules in the first updated set of rules.

6. An apparatus comprising:
    a processing device to:
        apply a first predetermined set of rules to an electronic media item to identify a first set of regions, wherein a plurality of regions in the first set of regions is associated with a first region type, the first predetermined set of rules specifying a combination of typographical features used to identify the first region type;
        analyze one or more regions in the first set of regions to determine a typographical feature set for the one or more regions;
        perform a cluster analysis to identify a first cluster of regions from the first set of regions, where a first typographical feature set of a first region in the first cluster and a second typographical feature set of a second region in the first cluster comprise values that are within a threshold of a desired value for the first cluster;
        update the first predetermined set of rules to account for typographical feature values determined from a centroid of the first cluster of regions to generate a first updated set of rules; and
        apply the first updated set of rules to the electronic media item to identify one or more regions associated with the first region type.

7. The apparatus of claim 6, wherein the processing device is further to:
    apply a second predetermined set of rules to the electronic media item to identify a second set of regions, wherein a plurality of regions in the second set of regions is associated with a second region type;
    analyze one or more regions in the second set of regions to determine an additional typographical feature set for the second set of regions;
    perform a second cluster analysis based on the additional typographical feature set to identify a second cluster of regions;

update the second predetermined set of rules based on the second cluster analysis to generate a second updated set of rules; and apply the second updated set of rules to the electronic media item to identify one or more regions associated with the second region type.

8. The apparatus of claim 7, wherein the processing device is further to:

correct one or more regions in response to a user input to generate a corrected one or more regions;

analyze the corrected one or more regions to obtain an updated typographical feature set;

modify one or more of the first updated set of rules or the second updated set of rules to reflect the updated typographical feature set to generate a third updated set of rules or a fourth updated set of rules; and apply one or more of the third updated set of rules or the fourth updated set of rules to the electronic media item to identify one or more regions associated with the first region type or the second region type.

9. The apparatus of claim 8, wherein the user input is indicative of one or more of: corrected sizes for the one or more regions or corrected region types associated with the one or more regions.

10. The apparatus of claim 6, wherein the processing device is further to:

generate a page layout for a first page of the electronic media item;

compare the page layout with one or more template page layouts; and update one or more regions in the first page to correspond to the one or more template page layouts.

11. The apparatus of claim 10, wherein to generate the page layout for the first page, the processing device is further to:

perform one or more morphological operations on the first page.

12. The apparatus of claim 6, wherein the first typographical feature set comprises data indicative of one or more of: font size, line spacing, line length, token spacing, margin size, indentation, or region area.

13. The apparatus of claim 6, wherein the first region type comprises one or more of: a chapter heading, a graphic, a body text, a header, a footer, a table, a list item, a footnote, a table of contents entry, or an equation.

14. The apparatus of claim 6, wherein the processing device is further to:

iterate the applying, the analyzing, the performing, and the updating, until the first cluster of regions converges.

15. The apparatus of claim 14, wherein the first cluster of regions converges when the first cluster of regions stops changing between iterations.

16. The apparatus of claim 14, wherein the first cluster of regions converges when a size of the first cluster of regions is greater than a threshold.

17. A non-transitory computer-readable storage medium storing instructions which, when executed, cause a processing device to:

apply a first predetermined set of rules to an electronic media item to identify a first set of regions, wherein a plurality of regions in the first set of regions is associated with a first region type, the first predetermined set of rules specifying a combination of typographical features used to identify the first region type;

analyze one or more regions in the first set of regions to determine a typographical feature set for the one or more regions;

perform, by the processing device, a cluster analysis to identify a first cluster of regions from the first set of regions, where a first typographical feature set of a first region in the first cluster and a second typographical feature set of a second region in the first cluster comprise values that are within a threshold of a desired value for the first cluster;

update the first predetermined set of rules to account for typographical feature values determined from a centroid of the first cluster of regions to generate a first updated set of rules; and apply the first updated set of rules to the electronic media item to identify one or more regions associated with the first region type.

18. The non-transitory computer-readable storage medium of claim 17, wherein the processing device further to:

apply a second predetermined set of rules to the electronic media item to identify a second set of regions, wherein a plurality of regions in the second set of regions is associated with a second region type;

analyze one or more regions in the second set of regions to determine an additional typographical feature set for the second set of regions;

perform a second cluster analysis based on the additional typographical feature set to identify a second cluster of regions; and update the second predetermined set of rules based on the second cluster analysis to generate a second updated set of rules; and apply the second updated set of rules to the electronic media item to identify one or more regions associated with the second region type.

19. The non-transitory computer-readable storage medium of claim 18, wherein the processing device further to:

correct one or more regions in response to a user input to generate a corrected one or more regions;

analyze the corrected one or more regions to obtain an updated typographical feature set;

modify one or more of the first updated set of rules or the second updated set of rules to reflect the updated typographical feature set to generate third updated set of rules or a fourth updated set of rules; and apply one or more of the third updated set of rules or the fourth updated set of rules to the electronic media item to identify one or more regions associated with the first region type or the second region type.

20. The non-transitory computer-readable storage medium of claim 19, wherein the user input is indicative of one or more of: corrected sizes for the one or more regions or corrected region types associated with the one or more regions.

21. The non-transitory computer-readable storage medium of claim 17, wherein the processing device further to:

generate a page layout for a first page of the electronic media item;

compare the page layout with one or more template page layouts; and update one or more regions in the first page to correspond to the one or more template page layouts.

22. The non-transitory computer-readable storage medium of claim 21, wherein to generate the page layout for the first page, the processing device to:

perform one or more morphological operations on the first page.

23. The non-transitory computer-readable storage medium of claim 17, wherein the first typographical feature set comprises data indicative of one or more of: font size, line spacing, line length, token spacing, margin size, indentation, or region area.

24. The non-transitory computer-readable storage medium of claim 17, wherein the first region type comprises one or more of: a chapter heading, a graphic, a body text, a header, a footer, a table, a list item, a footnote, a table of contents entry, or an equation.

25. The non-transitory computer-readable storage medium of claim 17, wherein the processing device further to:
   iterate the applying, the analyzing, the performing, and the updating, until the first cluster of regions converges.

26. The non-transitory computer-readable storage medium of claim 25, wherein the first cluster of regions converges when the first cluster of regions stops changing between iterations.

27. The non-transitory computer-readable storage medium of claim 25, wherein the first cluster of regions converges when a size for each cluster in the first cluster of regions is greater than a threshold.

\* \* \* \* \*